Patented Sept. 17, 1946

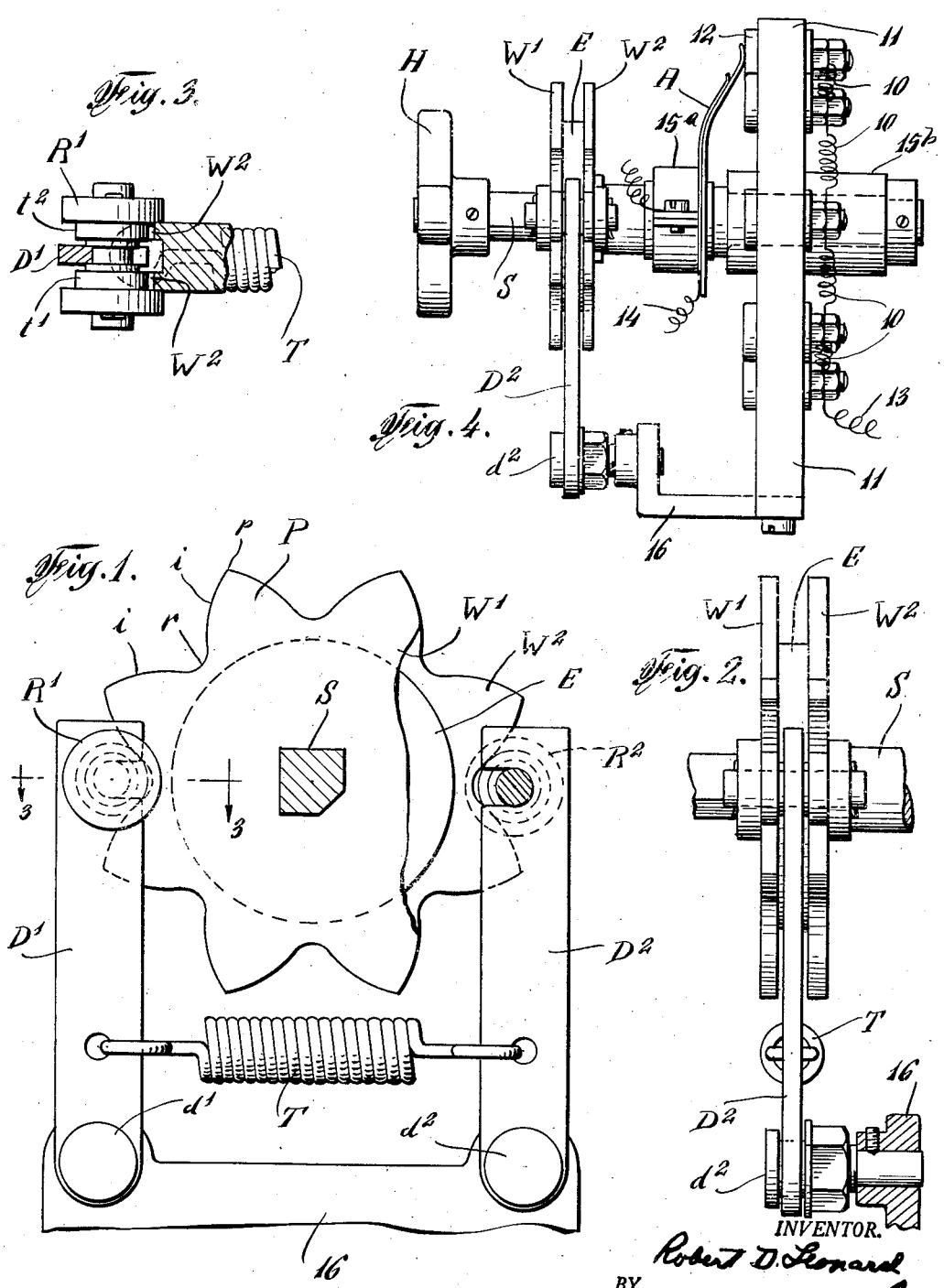

2,407,840

UNITED STATES PATENT OFFICE 2,407,840

ROTARY INDEXING MECHANISM

Robert D. Leonard, Aldan, Pa.

Application February 2, 1945, Serial No. 575,884

2 Claims. (Cl. 74—527)

This invention relates to rotary indexing mechanisms and more particularly to rotary indexing mechanisms wherein a star wheel, having a number of points corresponding to the total number of indexing positions, is provided together with a spring opposed manually operative means for rotating said star wheel forward and reverse about its axis to successive indexing positions.

One object of the invention is to provide a spring opposed manually operative means for rotating said star wheel about its axis which substantially eliminates stalling of the star wheel in any position intermediate the desired indexing positions.

Another object is to provide a sturdy, dependable spring opposed manually operating means for star wheel rotary indexing mechanisms.

Still another object is to provide an improved star wheel rotary indexing mechanism for use in rotary switches and the like electrical control devices.

Other objects will be apparent as the invention is more fully hereinafter disclosed.

In accordance with these objects I have devised the improved manually operative star wheel rotary indexing mechanism, one specific embodiment of which is illustrated in the accompanying drawing, which mechanism is characterized by being sturdy, dependable, and by being operative manually to successive indexing positions in forward and reverse motion, without stalling at any position intermediate the desired indexing position.

Referring to the drawing, the specific embodiment illustrated is one designed specifically for use in association with rotary switches and the like electrical devices wherein it is desired to shift an electrical contact in an annular path about a center axis to one of a plurality of positions, at which positions the said contact closes an electrical circuit. In such devices the contact may either form the connecting contact between two lead wires at each indexing position or may carry the current from one side of a power supply source connected thereto through the indexing position into an electrical circuit connected to the opposite side of the said power supply source or, alternatively, may operate to short circuit, or cut out of circuit, certain portions of an electrical circuit connected between both sides of a power supply line, such as for example, in a rheostat.

In the drawing,

Fig. 1 is a front elevational view of the main elements of the indexing mechanism of the present invention;

Fig. 2 is a side elevational view of the same;

Fig. 3 is an enlarged sectional view taken along plane 3—3 of Fig. 1, illustrating one feature of the present invention; and Fig. 4 is a side elevational view of a rotary rheostat means improved in accordance with the present invention.

The improved rotary star wheel indexing mechanism of the present invention consists essentially of a pair of identically shaped star wheels $W^1$ and $W^2$ mounted in determined spaced relation upon axially rotatable shaft S by spacer element E to rotate with rotation of said shafts S. The total number of star points P on each wheel $W^1$ and $W^2$ corresponds to the total number of indexing positions it is desired to provide for contact arm A (Fig. 4) in an annular path about the axis of shaft S.

Points P of each star wheel $W^1$ and $W^2$ are shaped to provide a sharp point $p$ at the point extremity, a curved recess rest position $r$ at the base of each point P and between each adjacent point P, with an outwardly curved intermediate area $i$, on each star point P as will be hereafter more fully explained.

In the manual rotation of shaft S and star wheels $W^1$ and $W^2$ in forward and reverse directions about the shaft axis of shaft S to bring points P into successive indexing positions, various means have heretofore been proposed wherein the rotary movement is opposed by a spring means operative first to oppose rotary movement of the shaft S up to a certain point of rotation and thereafter to accelerate or to assist the rotary movement of the shaft S to the next indexing position, especially so where arm A is designed to perform the function of making and breaking electrical circuits. In such devices, a quick make and break action is desired to prevent the formation of an electric discharge or arc between the current carrying terminals.

Heretofore in the art, in rotary star wheel indexing mechanisms one of the major difficulties encountered in the design and application of such a means effecting a quick make and break action has been the provision of a sturdy, durable and dependable means which is quick acting and which is inherently incapable of stopping at an intermediate position and which when in rest position requires the application of a definite manual force to rotate the shaft out of rest position forward and reverse to the point where the spring urged means will be operative to quickly break the contact in the old position and move the contact arm quickly to the new indexing position.

The spring energized arrangement of the present invention aims to overcome these difficulties and accomplishes this desired result through the cooperating action obtained between inwardly spring urged rollers $R^1$, $R^2$, engaging the side edges of spaced star wheels $W^1$ and $W^2$ on diametrically opposite sides, said rollers $R^1$ and $R^2$ being held in spring urged rolling contact with the outer edges of the spaced star wheels $W^1$ and $W^2$ in the free end of end pivoted arms $D^1$, $D^2$, pivoted at $d^1$—$d^2$ which are spring urged together by tension spring T at a point intermediate the pivoted end and the free end of arms $D^1$ and $D^2$ substantially in the manner illustrated in the drawing.

Rollers $R^1$ and $R^2$ are specially designed to provide roller trackways $t^1$ and $t^2$ within which to engage the side edges of spaced star wheels $W^1$ and $W^2$, each said trackway providing for overlapping the star wheel engaged therein to prevent disengagement of the star wheel edge therein with the arms $D^1$ (or $D^2$ on the opposite roller $R^2$) serving as a spacer member therebetween.

The diameter of rollers $R^1$ and $R^2$ is selected relative to the diameter of arcuate recess $r$ in the spaced star wheels $W^1$ and $W^2$ to seat snugly therein and the outwardly arcuate section $i$ on each side of each point P of the spaced star wheels $W^1$ and $W^2$ is selected relative to the spring tension of spring T to provide initially considerable resistance to the manual displacement of rollers $R^1$ and $R^2$ from rest position in arcuate recess $r$ upon axial rotation of shaft S, a lessening of said resistance as the point end $p$ is approached, and an abrupt removal of all resistance as the point end $p$ is passed in either direction of rotation thereby to effect independently of manual effort a quick rotary movement (forward or reverse) of the star wheels $W^1$ and $W^2$ to the next indexing position fixed by the seating of rollers $R^1$ and $R^2$ in the next following arcuate recess or rest position. The precise speed at which the rollers $R^1$ and $R^2$ are moved, forward or reverse, after passing over point $p$ may be regulated by adjusting the tension of spring T.

The rotary indexing mechanism above described may be widely modified and varied without essential departure from the present invention, particularly as to the method of mounting rollers $R^1$ and $R^2$ in spring urged rolling engagement with the edges of star wheels $W^1$ and $W^2$, as one skilled in the art may readily perceive, and may be utilized in association with a plurality of devices requiring such a rotary indexing mechanism. One adaptation is illustrated in Fig. 4, which is a typical electrical rheostat wherein an electrical resistor 10 consisting of a plurality of coiled lengths of wire of high electrical resistivity is disposed in an annular path upon a non-conductor support 11 through which support 11 extends a plurality of contact terminals 12 electrically connected to the resistor 10 at spaced intervals along the annular path thereof. One end of the resistor is electrically connected to one side of a source of current and the other side of the source of current is electrically connected through conductor 14 to arm A mounted for indexing rotation on shaft S under the control of the indexing mechanism of the present invention with shaft S manually rotated by means of handle H.

Various different ways are available for mechanically assembling the indexing means of the present invention with the electrical device to be controlled thereby. In the arrangement illustrated the end of shaft S is shown mounted to be rotatable in bearings 15a and 15b sustained on opposite sides of panel member 11 with arms $D^1$—$D^2$ sustained by bracket support member 16.

In the construction of the indexing mechanism of the present invention, it is essential to comprise star wheels $W^1$ and $W^2$ of relatively strong wear resistant material to eliminate the rounding off of point ends $p$ of the star points during service use. A plurality of materials are available in the art. Preferably rollers $R^1$ and $R^2$ are comprised of the same material or of material of the same hardness to lower the abrading action between the roller and contacting star wheel surfaces to a low figure. I prefer to employ a strong durable metal such as steel in forming star wheels $W^1$ and $W^2$ and rollers $R^1$ and $R^2$, preferably a steel alloy containing chromium in such an amount as to render the surface of the alloy rust and corrosion resistant, to eliminate the detrimental effect of rusting and corrosion on the smooth operational characteristics of the device, although means should be provided to lubricate the rollers $R^1$ and $R^2$ to prevent binding of the same in the recesses provided in arms $D^1$ and $D^2$.

It is believed apparent from the above disclosure taken with the drawing that the present invention may be widely varied without essential departure therefrom and all such modifications and departures are contemplated as may fall within the scope of the following claims.

What I claim is:

1. In a rotary indexing mechanism having a shaft mounted for axial rotation manually to locate an indexing member thereon to a plurality of regularly spaced indexing positions, an indexing means, said means comprising a pair of identical shaped star wheels each having a plurality of star points corresponding in number to the said plurality of indexing positions and being regularly spaced apart a distance corresponding to the spacing between said indexing positions with the edges of said star points being outwardly curved to provide a high point thereon intermediate the tip and base of each star point with the base of adjacent star points grooved to provide an arcuate seat therein, means securing the star wheels coincidentally aligned upon the shaft in spaced relation to be rotated therewith with the arcuate seat between one pair of adjacent aligned star points in radial alignment with the indexing member on the shaft, and an inwardly spring urged roller member on opposite sides of said star wheels arranged for rotative engagement with the edges of said coincidentally aligned star wheels, each roller member being provided with grooves aligned to receive said star wheel edges, the diameter of the said roller member at the bottom of each groove approximating the diameter of the arcuate seat in the said star wheels.

2. In a rotary indexing mechanism having a shaft mounted for axial rotation manually to locate an indexing member thereon to a plurality of regularly spaced indexing positions, an indexing means, said means comprising a pair of identical shaped star wheels each having a plurality of star points corresponding in number to the said plurality of indexing positions and being regularly spaced apart a distance corresponding to the spacing between said indexing positions with the edges of said star points being outwardly curved to provide a high point thereon intermediate the tip and base of each star point with the base of adjacent star points grooved to provide an arcuate seat therein, means securing the star wheels coincidentally aligned upon the shaft in spaced relation to be rotated therewith with the arcuate seat between one pair of adjacent aligned star points in radial alignment with the indexing member on the shaft, and an inwardly spring urged means on opposite sides of said star wheels for engaging the edges of said aligned star wheels to restrain axial rotation of the shaft in forward and reverse directions from each indexing position, said last mentioned means including a pair of arms one on each side of the said star wheels, each mounted to be pivotally sustained at one end with the free end lying adjacent the star wheels at a point intermediate the two wheels, a spring member connected between the arms and normally urging the two arms together, a roller member rotatively seated in the free end of each arm in a position engaging the edges of said aligned star wheels on diametrically opposite sides of said star wheels, each said roller member being provided with grooved recesses within which to receive said star wheel edges, the diameter of the roller member at the bottom of said grooved recesses approximating the diameter of the arcuate seat in the said star wheels.

ROBERT D. LEONARD.